2,948,066

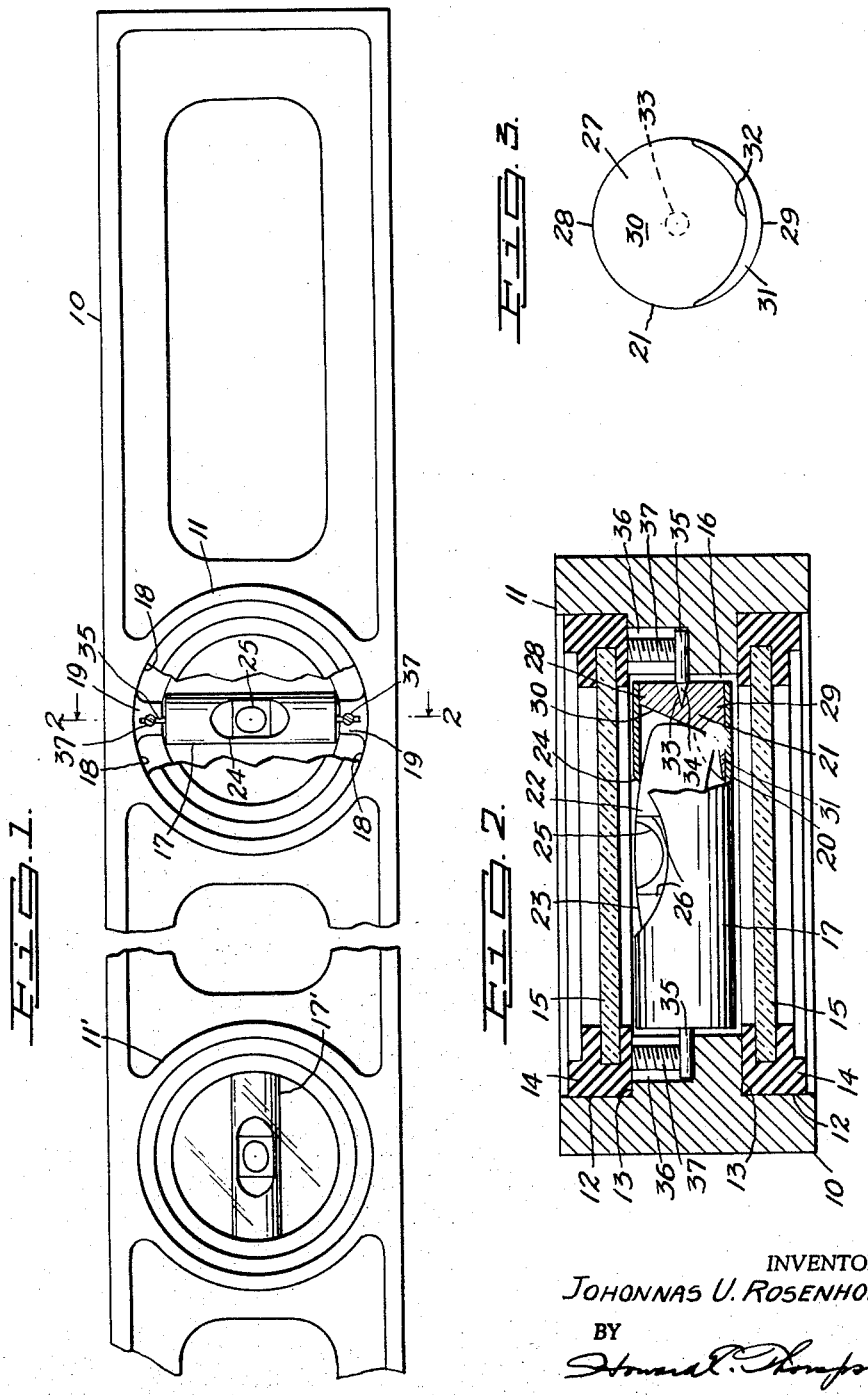

GRAVITY WEIGHTED SPIRITS FOR SPIRIT LEVELS

Johonnas U. Rosenholm, 43—01 46th St., Long Island City, N.Y.

Filed Oct. 15, 1957, Ser. No. 690,230

3 Claims. (Cl. 33—211)

This invention relates to spirit levels employing a combination of transverse and longitudinally arranged spirit elements for the taking of different readings in the use of a level. More particularly, the invention deals with what may be termed an automatically operating spirit device, wherein the spirit tube is arranged in a weighted casing, so as to, at all times, position the spirit, or the reading bubble thereof, upright on the device, regardless of the position in which the level is held or positioned.

Still more particularly, the invention deals with a device of the character described, wherein each spirit element is arranged in a sealed casing having opposed transparent panels, so as to render the elements substantially watertight.

The novel features of the invention will be best understood from the following description, when taken together with the accompanying drawing, in which the separate parts are designated by suitable reference characters in each of the views and, in which:

Fig. 1 is a plan view of one end portion of a spirit level, indicating part of the central portion of the level broken away and with part of the construction otherwise broken away.

Fig. 2 is an enlarged section on the line 2—2 of Fig. 1, with part of the construction shown in elevation; and Fig. 3 is a detail face view of one of a number of weight elements which I employ.

In Figs. 1 and 2 of the drawing, I have shown at 10 the stock of a spirit level which may be of any desired construction. In the present illustration, the stock is preferably a metal stock having, at end portions, ring-like spirit element mounting bearings or portions, one end bearing only being shown at 11 in Fig. 1 of the drawing, it being understood that an identical bearing is disposed at the opposed end portion of the level 10. Centrally of the spirit level is an identical bearing 11' and, as the structures of both bearings 11, 11' are the same, except for positioning of the parts, the brief description of the bearing 11 will apply to both.

The bearing 11 has large diameter recessed sides, as at 12, to form shoulders 13, upon which rubber sealing rings 14 are mounted, the rings being fashioned to receive glass or other transparent panels 15, as clearly noted in Fig. 2 of the drawing.

Centrally of the spirit stock 10, the bearing 11 has a smaller diameter chamber 16, in which the spirit element 17 is arranged.

The shoulders 13 are partially cut out, as indicated at 18 in Fig. 1 of the drawing, to leave opposed bearing lugs 19. These lugs are arranged at the long sides of the stock 10 on the end spirits 11 and will be located in longitudinal alinement in supporting the longitudinal element 17', as clearly indicated in Fig. 2 of the drawing.

The element 17 comprises a tubular casing 20, having, adjustably fixed in the ends thereof, gravity actuated weight members 21 for positioning the spirit 22 in the tube, so that the rounded surface 23 thereof will be properly positioned in the elliptical opening 24, giving vision to the bubble 25 of the spirit and its positioning with respect to the usual guide markings 26 employed on spirit devices. At this time, it will be understood that the members 21 are suitably secured by cementing, braising or otherwise in the tube 20 after proper positioning of the spirit 22 in said tube.

Only one of the members 21 is illustrated in section in Fig. 2 of the drawing. It will be apparent, however, that a corresponding member is disposed in the opposed end portion of the tube 20. As each member 21 is of the same structure, the brief description of one will apply to all.

The member 21 is formed from a reasonably heavy metal and fashioned to form a circular disc 27, note Fig. 3, to fit snugly in the tube 20, the disc 27 having a narrow upper end 28 and a wide lower end 29 former by the tapered surface 30, as clearly noted in the section of Fig. 2. The lower wide end and part of the sides of the disc 27 also include an extending crescent-shaped tapered portion 31 for the purpose of adding additional weight to the members 21 and also to form a curved socket 32, in which end portions of the spirit 22 are adapted to be positioned.

Each member 21 has a bevelled bearing aperture 33 adapted to receive the pointed end 34 of a pivot pin 35, this construction providing a sensitive and substantially frictionless pivotal support of the element 17 in the chamber 16, so that the weighted members will operate by gravity, at all times, to maintain the opening 24 of the tube 20 upright to effect a reading in different uses of the spirit level.

In mounting the element 17 in the chamber 16, the pins 35 are positioned in the members 21 and the pins are then passed downwardly through apertures 36 in the lugs 19, after which, screws 37 are mounted in the lugs and these screws are tightened as and when the element 17 is properly positioned in the chamber 16, it being clear from Fig. 2 of the drawing that clearance is provided for the pins 35 in the apertures 36 to accomplish this result.

The cutaway portions, as at 18, provide the necessary clearance in the chamber 16 for free rotation of the element 17, but these cutaway portions are only positioned adjacent the lugs 19. In fact, it is the cutaway portions 18 which form, of the shoulders 13, the lugs 19 and these cutaway portions only extend a depth sufficient to freely clear the large diameter of the element 17.

After the element 17 has been mounted in position in the chamber 16, the sealing rings 14, with the transparent panels 15 mounted therein, are then forcibly placed in the recesses 12, thus sealing the chamber 16, so as to prevent any foreign elements of any kind entering the chamber to interfere with free gravity operation of the spirit elements 17, 17' in the stock 10.

With spirit levels of the type and kind under consideration, it has been the common practice to provide, at each end portion and centrally of the spirit level, pairs of spirit devices oppositely disposed with respect to each other, so as to take reading in different positions of the spirit level. With my improved construction, only a single spirit element is required at each end portion of the level and centrally thereof, the spirit element automatically adjusting itself to the reading position by the action of gravity. This operation takes place in positioning of the level in any desired position with respect to a surface, in connection with which a reading is to be taken.

In continued use of the device, it will be apparent that the sealing rings 14 can be forcibly removed or at least one of such rings, the ring giving access to the screws 37, and these screws can be removed for removal of the element 17 for repair, cleaning and/or replacement.

Having fully described my invention, what I claim as new and desire to secure by Letters Patent is:

1. A spirit level employing a stock, the stock having, at end portions and centrally thereof, chambers for mounting spirit elements therein for visibility through opposed surfaces of the stock, a spirit element mounted in each chamber, some of the spirit elements being disposed transversely of the stock and one of said elements being arranged longitudinally of the stock, each element comprising a tube with a spirit vial in said tube, weight members within end portions of the tube, said members weighting the tube for gravity positioning of the element in taking a reading from the element in the use of the stock, and means engaging end portions of the tube and aligned with geometric axis of the tube for providing a substantially frictionless rotatable support of each element freely in its chamber.

2. A structure as defined in claim 1, wherein the last named means comprises pivot pins having bearing supports in opposed end portions of each element, and means definitely positioning the pins in the stock to position the element for free rotation in its chamber.

3. A structure as defined in claim 2, wherein said tube has a central aperture arranged opposed to the weighted portion of said members, the central portion of said spirit registering with said aperture, and ends of said spirit seating on said members.

References Cited in the file of this patent

UNITED STATES PATENTS

| | | |
|---|---|---|
| 657,675 | Quinby | Sept. 11, 1900 |
| 1,604,052 | King | Oct. 19, 1926 |
| 2,111,094 | Erickson | Mar. 15, 1938 |
| 2,502,905 | Vaida et al. | Apr. 4, 1950 |